(12) United States Patent
Bishop

(10) Patent No.: US 6,872,118 B1
(45) Date of Patent: Mar. 29, 2005

(54) GAME CALL DEVICE

(76) Inventor: Ricky Joe Bishop, 867 Hidden Lakes Rd., Warm Springs, GA (US) 31830

( * ) Notice: Subject to any disclaimer, the term of this patent is extended or adjusted under 35 U.S.C. 154(b) by 0 days.

(21) Appl. No.: 10/675,837

(22) Filed: Sep. 30, 2003

(51) Int. Cl.[7] .................................................. A63H 5/00
(52) U.S. Cl. ........................ 446/397; 446/176; 446/180; 446/418; 84/404
(58) Field of Search ................................ 446/397, 176, 446/180, 418, 213, 404; 84/404, 402, 410, 408

(56) References Cited

U.S. PATENT DOCUMENTS

| | | | | |
|---|---|---|---|---|
| 1,449,756 A | * | 3/1923 | Jackson | 446/397 |
| 2,573,856 A | * | 11/1951 | Malone, Sr. | 446/406 |
| 2,643,483 A | * | 6/1953 | Walker | 446/397 |
| 2,958,157 A | * | 11/1960 | Porterfield | 446/397 |
| 3,208,184 A | * | 9/1965 | Wisor | 446/397 |
| 4,041,639 A | * | 8/1977 | Funk | 446/397 |
| 4,606,733 A | * | 8/1986 | Willis | 446/397 |
| 4,662,858 A | | 5/1987 | Hall | |
| 5,178,575 A | | 1/1993 | Koch | |
| 5,562,521 A | * | 10/1996 | Butler et al. | 446/397 |
| 5,921,842 A | | 7/1999 | Allenby | |
| 6,149,492 A | | 11/2000 | Davis, Jr. | |
| 6,443,803 B1 | | 9/2002 | Epple, Jr. | |

* cited by examiner

*Primary Examiner*—Bena Miller
(74) *Attorney, Agent, or Firm*—Myers & Kaplan, LLC; Duane N. Moore

(57) ABSTRACT

A frictional-type game calling apparatus, wherein a striking plate is adapted to be frictionally contacted by a striker for reproducing the mating, gathering, and feeding calls of wild turkeys. The present apparatus and method allows for easy, one-handed operation, wherein the striker is held in constant contact with the striking plate, thereby allowing unrestricted use of the game call in any physical orientation.

22 Claims, 4 Drawing Sheets

GAME CALL DEVICE

TECHNICAL FIELD

The present invention relates generally to a game calling apparatus, and more specifically to a dual friction-type turkey call, wherein a striking plate is adapted to be frictionally contacted by a striker for audibly reproducing the mating, gathering, and feeding calls of wild turkeys.

BACKGROUND OF THE INVENTION

Game call devices for simulating the sound of turkeys or other game birds are prevalent within the hunting industry. Most conventional game call devices typically comprise a slate box and the manual use of a striking stick. To operate such devices, the slate is held in one hand while the stick is held in the other. The stick is brought into contact with the slate in short strokes to simulate the calls of the wild turkey. However, because the stick must strike the slate at a certain angled stroke length with a certain force in order to simulate the bird calls accurately, much practice and skill is required to effectively mimic or reproduce the desired calls. As such, it is extremely difficult for a beginner to accurately simulate the calls via use of such a hand-held device. Operation of these devices can also be cumbersome for even the most experienced hunters. Specifically, when a turkey approaches, the device must be put down so that the shotgun can be picked up, often resulting in loss of the most opportune moment for aiming and shooting at the turkey.

Although friction-type game call devices requiring single-hand operation are available, such devices are limited in application, as they must be held in a particular vertical orientation to ensure that the striker is held in gravitational contact with the slate. Such restrictions can be extremely cumbersome, especially while tracking a moving target and attempting to prepare a shotgun for firing at same.

Therefore, it is readily apparent that there is a need for a game call device that facilitates single-handed operation by enabling the striker to be held in constant contact with the sounding device, thereby allowing unrestricted use of the game call in any physical orientation. Furthermore, there is a need for a game call device that combines the features and advantages of conventional frictional-type and striking stick devices with the features and advantages of available single-handed devices.

BRIEF SUMMARY OF THE INVENTION

Briefly described, in a preferred embodiment, the present invention overcomes the above-mentioned disadvantages and meets the recognized need for such a device by providing a friction-type game call device comprising a striking plate member and a striking assembly secured to one another, wherein the single-handed operational feature of the game call device permits unrestricted use of the game call device in any physical orientation for accurately simulating and reproducing the sound of turkeys and other game birds.

According to its major aspects and broadly stated, the present invention in its preferred form is a game call device generally comprising a striking plate member and a striking assembly. More specifically, the present invention comprises a striking plate member wherein a striking plate is fixed to the bottom side to provide a frictional surface for contacting a striking stick, and wherein a cavity is formed in the top side for receiving the striking assembly. The striking assembly also comprises a striking plate, wherein the striking plate is manually slid over a stationary striking block to simulate the sounds of turkeys and other game birds, and wherein an elastic retention member is provided to urge the striking plate against the striking block and to automatically return the striking plate to its original starting position within the striking assembly.

Accordingly, a feature and advantage of the present invention is its unique combination and orientation of components, including its acoustic channels and chambers, that amplify the sounds generated by the device.

Another feature and advantage of the present invention is its strategic placement of the sounding board to facilitate the combination of a conventional frictional-type and striking stick device with a one-handed use device.

Another feature and advantage of the present invention is its ability to automatically return the striking plate to its original starting position.

Another feature and advantage of the present invention is its ability to hold the striking plate in constant contact with the striking block, thereby allowing unrestricted use of the game call device in any physical orientation.

Another feature and advantage of the present invention is its ability to accurately simulate and mimic the mating, gathering, and feeding calls of wild turkeys.

Another feature and advantage of the present invention is that its compact size allows for easy and efficient use, and allows a user to readily store the device in his or her pocket.

Another feature and advantage of the present invention is its single-handed operation that permits the user to utilize his or her free hand for other activities, such as shooting.

Another feature and advantage of the present invention is that its preset orientation of components allows unskilled users of game call devices to easily utilize the device without practice.

Another feature and advantage of the present invention is its ability to accurately simulate turkey fighting purrs by operating the single-handed use assembly and the striking stick device simultaneously.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

In describing the preferred and selected alternate embodiments of the present invention, as illustrated in FIGS. 1–4, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
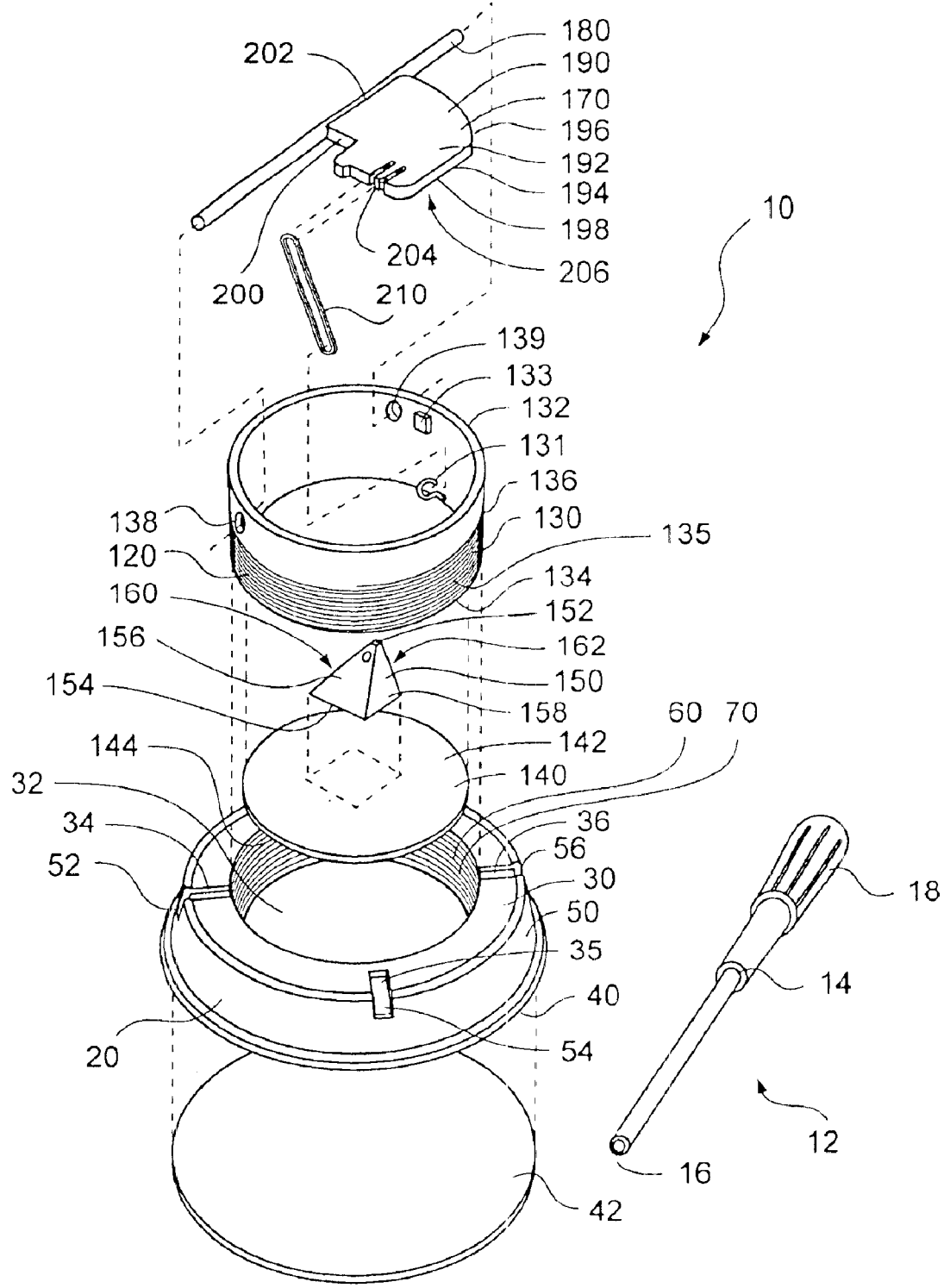
FIG. 1 is an exploded perspective view of a preferred embodiment of the present invention.
Figure 2:
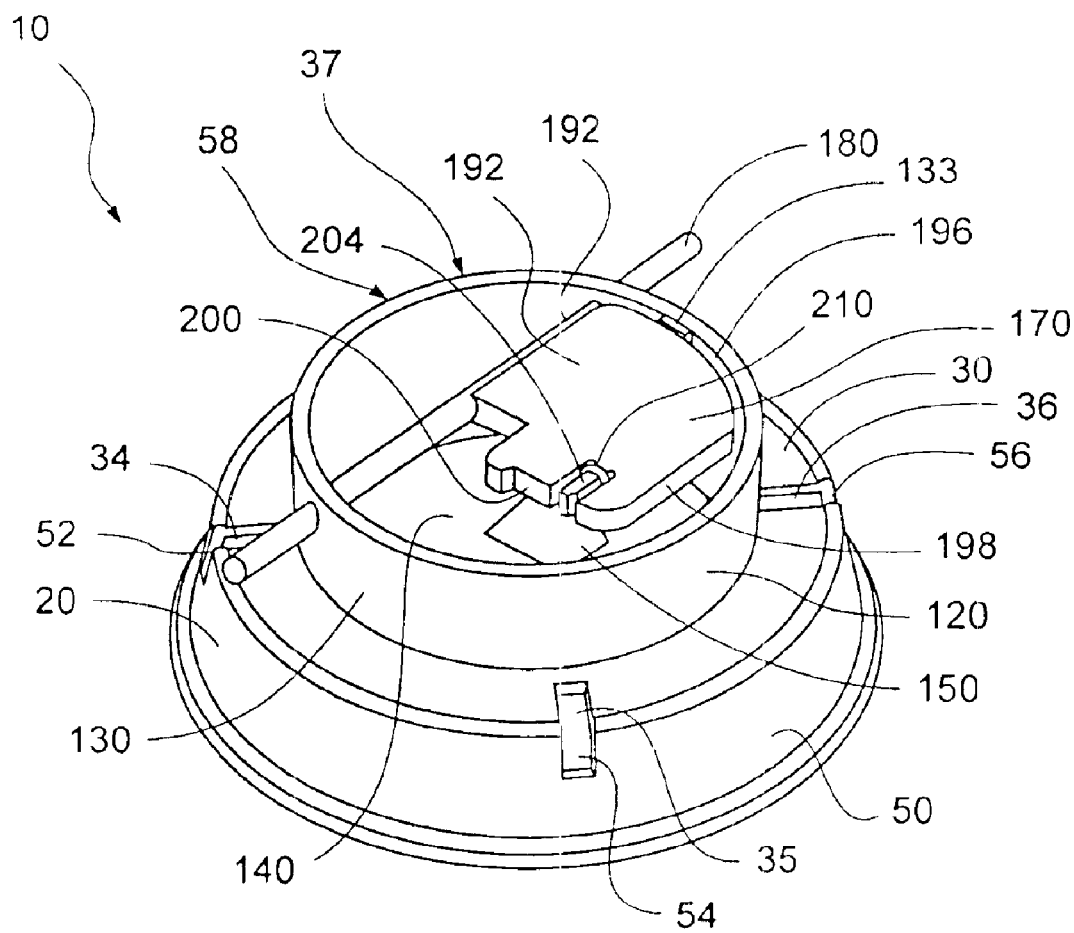
FIG. 2 is a perspective view of the top side of a preferred embodiment of the present invention.
Figure 3:
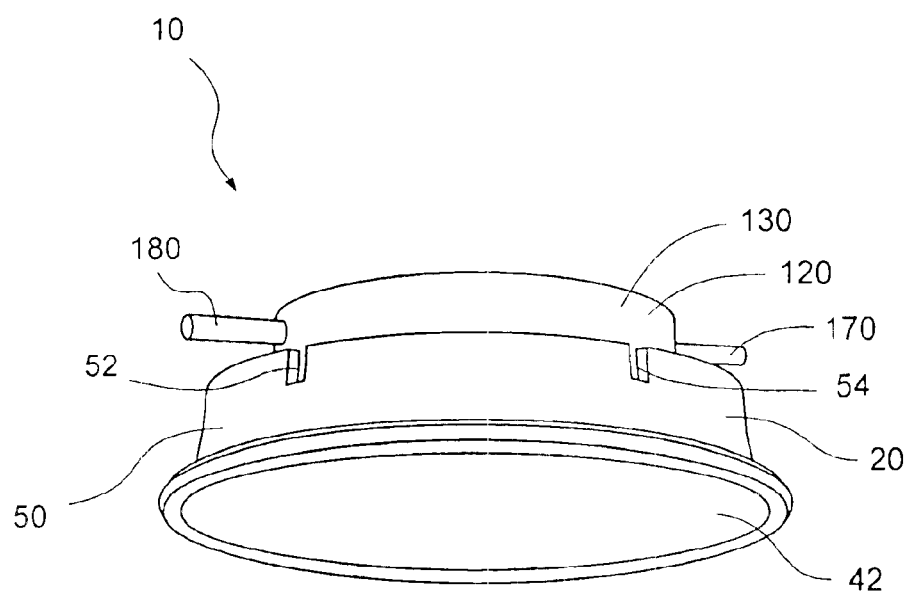
FIG. 3 is a perspective view of the bottom side of a preferred embodiment of the present invention.
Figure 4:
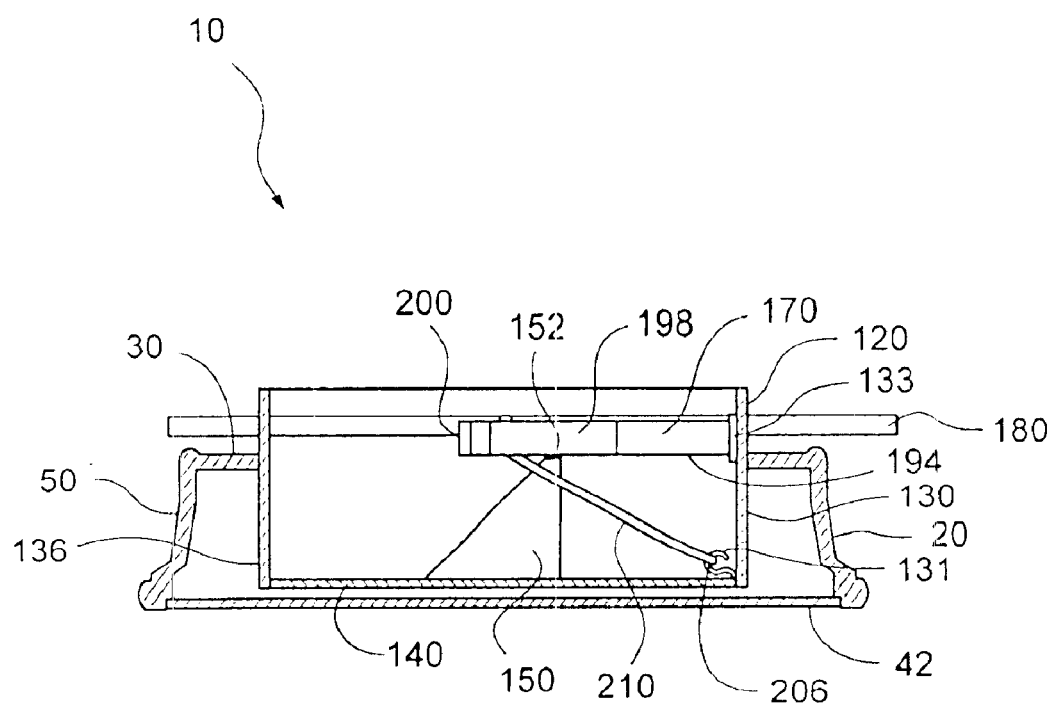
FIG. 4 is a cross-sectional view of a preferred embodiment of the present invention.

Referring now to FIGS. 1–4, the present invention in a preferred embodiment is a game call apparatus 10 generally preferably possessing striking plate member 20 and striking assembly 120. As best illustrated in FIG. 1, striking plate member 20 and striking assembly 120 are preferably removably secured to one another to form game call apparatus 10. Although it is preferred that apparatus 10 possess two general components, namely striking plate member 20 and striking assembly 120, it is contemplated in an alternate embodiment that apparatus 10 could comprise any number of individual components, such as, for exemplary purposes only, a single molded unit wherein a top portion functions as a one-handed use frictional-type game call, and wherein a bottom portion functions as a striking plate.

Striking plate member 20 is preferably substantially cylindrical-shaped and preferably comprises top side 30, bottom side 40, outer peripheral side wall 50, and inner side wall 60. Preferably, cavity 32 is formed in the center of top side 30, wherein cavity 32 is substantially circular-shaped and dimensioned for receiving striking assembly 120 therein, thereby removably securing striking plate member 20 to striking assembly 120. Formed preferably on side wall 60 is threaded interface 70, dimensioned for reception of a threaded engagement formed on striking assembly 120, as more fully described below. Although it is preferred that striking assembly 120 be removably securable to striking plate member 20 via threaded engagement, it is contemplated in an alternate embodiment that striking assembly 120 and striking plate member 20 could be removably or non-removably attached to one another by other means known within the art, such as, for exemplary purposes only, frictional fit, screws, snaps, and/or a tab and slot system. As more fully described below, cavity 32 further functions as an acoustic chamber and changing the depth of insertion of striking assembly 120 into striking plate member 20 changes the tone of sound created by apparatus 10.

Preferably disposed on top side 30 are four equally spaced-apart acoustic channels 34, 35, 36 and 37, wherein each acoustic channel preferably extends from cavity 32 to peripheral side wall 50, thereby disposing four rectangular-shaped apertures 52, 54, 56 and 58 within peripheral side wall 50. Preferably, acoustic channels 34, 35, 36 and 37 are configured such that sound emanating from cavity 32 resonates through acoustic channels 34, 35, 36 and 37, and exits out of apertures 52, 54, 56 and 58, as more fully described below. Although it is preferred that top side 30 have four acoustic channels 34, 35, 36 and 37 disposed thereon, it is contemplated in an alternate embodiment that top side 30 could eliminate acoustic channels 34, 35, 36 and 37, wherein apertures 52, 54, 56 and 58 would be located anywhere on peripheral side wall 50 so long as apertures 52, 54, 56 and 58 do not contact top side 30. Furthermore, although it is preferred that peripheral side wall 50 have apertures 52, 54, 56 and 58 disposed thereon, it is contemplated in an alternate embodiment that peripheral side wall 50 could eliminate apertures 52, 54, 56 and 58.

Preferably, striking plate 42 is integrally formed or permanently affixed to bottom side 40 by any suitable means known within the art, such as, for exemplary purposes only, glue, cement or rivets; however, it is contemplated in an alternate embodiment that striking plate 42 could be removably attached to bottom side 40 by any suitable means known within the art, such as, for exemplary purposes only, frictional fit, snaps, screws, or a tab and slot system. Moreover, although striking plate 42 is preferably circular-shaped, it is contemplated in an alternate embodiment that striking plate 42 could be any suitable shape and/or size, so long as striking plate 42 provides a surface large enough for a striking stick to stroke thereacross and simulate a turkey call, as more fully described below. Although striking plate 42 is preferably formed from metal, it is contemplated in an alternative embodiment that striking plate 42 could be formed from other flat, hard materials having a frictional surface, such as, for exemplary purposes only, aluminum, plastic, slate, tempered glass, crystal or the like. If striking plate 42 is selectively formed from tempered glass, the glass surface must be properly prepared for use as a striking plate. Generally, this involves scoring the surface of the glass to form miniature transverse grooves thereon. Scoring can be accomplished via polishing with Emory cloth or by any other suitable means.

Striking stick 12 preferably generally comprises top side 14 and bottom side 16. Although it is preferred that striking stick 12 is a cylinder-shaped rod, it is contemplated in an alternate embodiment that striking stick 12 could be any suitable shape and/or size, so long as striking stick 12 may be held in a fashion wherein bottom side 16 thereof may be frictionally slid across striking plate 42 of striking plate member 20, as more fully described below. Further, although it is preferred that striking stick 12 be formed from plastic, it is contemplated in an alternate embodiment that striking stick 12 could be formed from other solid, relatively strong materials, such as, for exemplary purposes only, glass, metal or wood, so long as bottom side 16 has a frictional surface for engaging striking plate 42 of striking plate member 20.

Top side 14 of striking stick 12 is preferably integrally formed or permanently affixed to grip handle 18 by any suitable means known within the art, such as, for exemplary purposes only, glue, cement or bolts; however, it is contemplated in an alternate embodiment that striking stick 12 could be removably attached to grip handle 18 by any suitable means known within the art, such as, for exemplary purposes only, frictional fit or screws. Although it is preferred that grip handle 18 is a substantially funnel-shaped handle, it is contemplated in an alternate embodiment that grip handle 18 could be any suitable shape and/or size so long as it functions as a non-slip handle for gripping striking stick 12. Further, although it is preferred that grip handle 18 is formed from plastic, it is contemplated in an alternate embodiment that grip handle 18 could be formed from other non-slip materials, such as, for exemplary purposes only, wood, metal or glass. It is further contemplated that striking stick 12 could entirely or partially eliminate grip handle 18.

Striking assembly 120 generally preferably comprises tube 130, sounding board 140, striking block 150, sliding member 170 and elastic retention member 210. Preferably, tube 130 has top side 132, bottom side 134, and peripheral sidewall 136. Although tube 130 is preferably cylinder-shaped, it is contemplated that tube 130 could embody alternate shapes, such as, for exemplary purposes only, ball, pyramid or cube. Preferably, the peripheral circumference of bottom side 134 is equal to the circumference of cavity 32 of striking plate member 20, wherein bottom side 134 can be inserted into cavity 32 of striking plate member 20 to removably attach striking assembly 120 to striking plate member 20 via threaded engagement. Formed preferably on the bottom of peripheral sidewall 136 is threaded engagement 135, dimensioned for reception by threaded interface 70 formed on striking plate member 20.

Also preferably disposed on peripheral sidewall 136 are apertures 138 and 139. Although it is preferred that apertures 138 and 139 are circular-shaped, it is contemplated that apertures 138 and 139 could alternatively embody other suitable shapes and/or sizes that allow insertion and movement of the elongated rod of sliding member 170, as more fully described below. Although it is preferred that top side 132 be open, thereby exposing the center of tube 130, it is contemplated in an alternate embodiment that top side 132 could be covered. Further, as more fully described below, tube 130 further functions as an acoustic chamber.

Preferably, attachment means 131 is disposed on the bottom inner wall of peripheral sidewall 136, wherein attachment means 131 preferably connects elastic retention member 210 to tube 130, as more fully described below. Although it is preferred that attachment means 131 be a hook, it is contemplated that attachment means 131 could alternatively embody other suitable attachment means, such as, for exemplary purposes only, clasps, pins, tabs, slots or glue. Additionally, pad 133 is preferably glued to the top inner wall of peripheral sidewall 136, wherein pad 133 is preferably attached directly above attachment means 131. It is recognized that pad 133, in alternate embodiments, could be attached by other means, such as, for exemplary purposes only, pins, snaps, or hook-and-loop fasteners. Although pad 133 is preferably a rectangular-shaped strip, it is contemplated in alternate embodiments that pad 133 may be any shape or size, so long as pad 133 functions to cushion the inner wall of tube 130 from sliding member 170. Further, although pad 133 is preferably formed from rubber, it is contemplated in an alternate embodiment that pad 133 could be formed from other soft materials, such as, for exemplary purposes only, sponge, felt or cotton.

Sounding board 140 generally preferably comprises top side 142 and bottom side 144, wherein top side 142 is preferably permanently fixed to bottom side 134 of tube 130 by any suitable means known within the art, such as, for exemplary purposes only, glue, cement or rivets; however, it is contemplated in an alternate embodiment that sounding board 140 could be removably secured to bottom side 134 by any suitable means known within the art, such as, for exemplary purposes only, frictional fit, snaps, screws or a tab and slot system. Although sounding board 140 is preferably circular-shaped, it is contemplated, in alternate embodiments, that sounding board 140 may be any suitable size or shape, so long as the planar area of sounding board 140 is less than or equal to the planar area of bottom side 134 of tube 130. Moreover, although sounding board 140 is preferably formed from aluminum, it is contemplated in an alternate embodiment that sounding board 140 could be formed from wood, plastic, glass, or any other suitable material capable of resonating the turkey call sounds simulated by apparatus 10. As more fully described below, positioning sounding board 140 between striking plate 42 of striking plate member 20 and the striking plate of striking assembly 120 preferably allows sounding board 140 to function as a sounding board for both striking plate member 20 and striking assembly 120.

Preferably, striking block 150 is pyramid-shaped and generally comprises top side 152, bottom side 154, and sidewalls 156, 158, 160 and 162, wherein bottom side 154 is substantially centered and permanently affixed to top side 142 of sounding board 140 by any suitable means known within the art, such as, for exemplary purposes only, glue, cement or rivets. Preferably, sidewall 156 is adjacent to bottom side 154 disposed at an angle approximately equal to 90 degrees therefrom, sidewall 158 is adjacent to bottom side 154 disposed at an angle approximately equal to 20 degrees therefrom, sidewall 160 is adjacent to bottom side 154 disposed at an angle approximately equal to 35 degrees therefrom, and sidewall 162 is adjacent to bottom side 154 disposed at an angle approximately equal to 35 degrees therefrom. It is recognized that striking block 150 could alternatively embody other suitable shapes and/or sizes, so long as top side 152 thereof is positioned below sliding member 170, and so long as top side 152 is positioned to engage the striking plate of sliding member 170.

Although striking block 150 is preferably formed from wood, it is contemplated in an alternate embodiment that striking block 150 could be formed from other solid, relatively strong materials so long as top side 152 has a frictional surface for engaging the striking plate of sliding member 170.

Preferably, sliding member 170 generally comprises elongated rod 180 and base member 190, wherein base member 190 generally comprises top side 192, bottom side 194, and sidewalls 196, 198, 200 and 202. Although sliding member 170 is preferably formed from plastic, it is contemplated in alternate embodiments that sliding member 170 may be formed from other suitable materials, such as, for exemplary purposes only, metal or wood. Elongated rod 180 is preferably a cylinder-shaped shaft; however, it is contemplated that elongated rod 180 could alternatively embody other suitable shapes and/or sizes, so long as elongated rod 180 is dimensioned to be retained by apertures 138 and 139 of tube 130, and so long as elongated rod 180 is able to easily slide in and out of apertures 138 and 139 of tube 130. Preferably, sidewall 196 of base member 190 is integrally formed or permanently affixed to the lateral side of elongated rod 180, wherein base member 190 is positioned such that sidewall 198 of base member 190 is less than 0.25 inch from the inner wall of tube 130 when elongated rod 180 is retained in tube 130. In such a preferred position, sidewall 196 is in direct contact with pad 133 of tube 130 and directly above attachment means 131 of tube 130. Sidewall 196 is preferably a curved surface to permit conformation of same to the curved inner wall of tube 130. Sidewall 200 of base member 190 preferably has attachment means 204 disposed thereon for attachment of elastic retention member 210. Although attachment means 204 preferably employs grooves to attach elastic retention member 210, it is contemplated in an alternate embodiment that any suitable means of attachment may be employed, such as, for exemplary purposes only, tabs, pins, pegs or clasps.

Preferably, striking plate 206 is integrally formed or permanently affixed to bottom side 194 of base member 190 of sliding member 170 by any suitable means known within the art, such as, for exemplary purposes only, glue, cement or rivets; however, it is contemplated in an alternate embodiment that striking plate 206 may be removably attached to bottom side 194 by any suitable means known within the art, such as, for exemplary purposes only, frictional fit, snaps, screws or a tab and slot system. Moreover, although striking plate 206 is preferably a rectangular strip, it is contemplated, in alternate embodiments, that striking plate 206 could be any suitable size or shape, so long as striking plate 206 provides a surface large enough for top side 152 of striking block 150 to frictionally slide thereacross and simulate a turkey call, as more fully described below. Although striking plate 206 is preferably formed from metal, it is contemplated in an alternative embodiment that striking plate 206 could be formed from other flat, hard materials having a frictional surface, such as, for exemplary purposes only, aluminum, plastic, slate, tempered glass, crystal, or the like. If striking plate 206 is alternatively formed from tempered glass, the glass surface must be properly prepared for use as a striking plate; generally via scoring of the glass surface to form miniature transverse grooves thereon. Scoring can be accomplished via polishing with Emory cloth or by any other suitable means.

Preferably, elastic retention member 210 is in the form of an elastic rubber band; however, it is recognized that elastic retention member 210 could alternatively embody other suitable shapes and/or sizes so long as it functions to hold striking block 150 in contact with sliding member 170 and automatically returns sliding member 170 to its original starting position when elastic retention member 210 is attached to sliding member 170 and tube 130, as more fully described below. One end of elastic retention member 210 is preferably attached to attachment means 131 of tube 130, and one end of elastic retention member 210 is preferably attached to attachment means 204 of sliding member 170. Preferably, elastic retention member 210 is disposed from sounding board 140 at an angle sufficient to produce a downward force and urge striking plate 206 against top side 152 of striking block 150. With this preset initial downward force, combined with the positioning of striking plate 206 and top side 152, the calls of a wild turkey can be accurately simulated by having uniform starting conditions and tuning, as more fully described below.

Either striking plate member 20 or striking assembly 120 may be utilized to simulate the calls of a wild turkey. To operate striking plate member 20, striking stick 12 is held in one hand and apparatus 10 is held in the other. Bottom side 16 of striking stick 12 is brought into contact with striking plate 42 of striking plate member 20 in short strokes to produce sounds simulative of turkey yelps, purrs, clucks and so on.

To operate striking assembly 120, the blunt end of elongated rod 180 of sliding member 170 is pushed into tube 130 so that striking plate 206 frictionally engages top side 152 of striking block 150. Unlike conventional frictional-type game call devices that move a striker over a striking plate, the present invention slides the striking plate over a stationary striker. Sliding member 170 is automatically returned to its original starting position within tube 130 by elastic retention member 210. No sound is produced by the return of sliding member 170. In addition, pad 133 is provided on the inner wall of striking assembly 120 so that a turkey will not be scared away by the noise of sliding member 170 colliding with the inner wall of striking assembly 120. The combination of the preset force urging striking plate 206 against top side 152 of striking block 150, the orientation of striking plate 206 and top side 152 with respect to each other, the types of materials utilized, and the configuration of the acoustic chambers result in the simulation and production of highly accurate turkey calls.

As discussed above, positioning sounding board 140 between striking plate 42 of striking plate member 20 and striking plate 206 of striking assembly 120 allows sounding board 140 to function as a sounding board for both striking plate member 20 and striking assembly 120. Preferably, sound vibrates off sounding board 140, resonates through cavity 32, travels through acoustic channels 34, 35, 36 and 37 and is transmitted out from apertures 52, 54, 56 and 58. In addition, sound vibrates off sounding board 140, resonates through tube 130, and is transmitted out top side 132.

In an alternate embodiment, striking block 150 could be a slate peg.

In another alternate embodiment, elastic retention member 210 could be a coiled spring.

In an alternate embodiment, elastic retention member 210 could be attached to sounding board 140.

In another alternate embodiment, pad 133 could be disposed on sidewall 196 of base member 190 of sliding member 170.

In yet another alternate embodiment, tube 130 of striking assembly 120 could possess a rain cover and an acoustic channel.

In still another alternate embodiment, striking plate member 20 could eliminate all channels and apertures.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A game call comprising:
   at least one striking plate member; and
   at least one striking assembly, wherein said at least one striking assembly comprises a tube to amplify sounds simulative of turkeys and other game birds, wherein a sliding member is positioned within said tube, wherein a first striking plate is disposed on the bottom of said sliding member, and wherein said first striking plate is positioned to frictionally engage a top side of a striking block.

2. The apparatus of claim 1, wherein a second striking plate is disposed on the bottom of said at least one striking plate member.

3. The apparatus of claim 2, wherein said second striking plate provides a frictional surface for contacting a striking stick.

4. The apparatus of claim 1, wherein a cavity is formed on a top side of said at least one striking plate member, wherein said cavity functions as an acoustic chamber to amplify sounds simulative of turkeys and other game birds.

5. The apparatus of claim 4, wherein said cavity also functions to receive and removably attach said at least one striking plate member to said at least one striking assembly.

6. The apparatus of claim 1, wherein at least one acoustic channel is formed on a top side of said at least one striking plate member to amplify sounds simulative of turkeys and other game birds.

7. The apparatus of claim 1, wherein said striking block is positioned towards the bottom of said tube, and wherein said striking block has a frictional top surface for engaging a striking plate.

8. The apparatus of claim 1, wherein said at least one striking assembly further comprises a pad for cushioning the contact between an inner wall of said tube and said sliding member.

9. The apparatus of claim 1, further comprising a sounding board positioned between said first striking plate and said second striking plate, wherein said sounding board functions to amplify the sounds simulative of turkeys and other game birds.

10. The apparatus of claim 1, wherein said striking block is pyramidal-shaped.

11. A game call comprising:
    at least one striking plate member; and
    at least one striking assembly, wherein said at least one striking assembly comprises a tube, a sliding member and at least one elastic retention member, wherein a first striking plate is disposed on the bottom of said sliding member, wherein a first end of said at least one elastic retention member is attached to a bottom inner wall of said tube, and wherein a second end of said at least one elastic retention member is attached to said sliding member.

12. The apparatus of claim 11, wherein said tube functions to amplify sounds simulative of turkeys and other game birds.

13. The apparatus of claim 11, wherein said at least one elastic retention member functions to automatically return said sliding member to its original position within said tube.

14. The apparatus of claim 11, wherein said at least one elastic retention member provides a downward force that urges said sliding member against said a striking block.

15. The apparatus of claim 11, further comprising a pyramidal-shaped striking block.

16. A method of simulating and producing game calls, said method comprising the step of:

moving a sliding member within an acoustic tube, wherein said sliding member is slid over a pyramidal-shaped striking block, and wherein a bottom side of said sliding member frictionally engages a top side of said pyramidal-shaped striking block.

17. The method of claim 16, wherein said sliding member is returned to its original starting position within said acoustic tube by an elastic retention member, and wherein said elastic retention member also urges said bottom side of said sliding member against said top side of said pyramidal-shaped striking block.

18. The method of claim 17, wherein said sliding member and said pyramidal-shaped striking block may be operated in any physical orientation.

19. The method of claim 16, wherein said game calls resound off a sounding board, resonate through a cavity formed within a striking plate member, travel through at least one channel formed within said striking plate member, and transmit out at least one aperture formed within said striking plate member.

20. The method of claim 16, wherein said game calls resound off said sounding board, resonate through said acoustic tube, and transmit out from a top side of said acoustic tube.

21. The method of claim 16, wherein said bottom of said sliding member has disposed thereon a striking plate, and wherein said top of said pyramidal-shaped striking block is a frictional surface.

22. The method of claim 16, wherein said sliding member could be moved over said pyramidal-shaped striking block by a single hand.

* * * * *